United States Patent [19]

Bradbury et al.

[11] 4,447,491

[45] May 8, 1984

[54] NETWORK OF BONDED EXPANDED POLYSTYRENE BEADS HAVING CHEMICALLY DELAMINATED VERMICULITE IMPREGNANT

[75] Inventors: John A. Bradbury; Reuben Rowlands, both of Runcorn; James W. Tipping, Liverpool, all of England

[73] Assignee: Imperial Chemical Industries Plc, London, England

[21] Appl. No.: 387,754

[22] Filed: May 11, 1982

[30] Foreign Application Priority Data

Jun. 17, 1981 [GB] United Kingdom ............... 8118638

[51] Int. Cl.³ .................. B32B 3/10; B32B 19/02; B32B 31/00
[52] U.S. Cl. .................. 428/304.4; 106/86; 106/121; 427/180; 427/294; 427/315; 427/373; 427/397.7; 428/308.4; 428/309.9; 428/312.6; 428/322.7; 428/446; 428/920; 428/921

[58] Field of Search ............ 428/304.4, 308.4, 309.9, 428/313.5, 313.7, 317.9, 319.1, 320.2, 322.7, 312.6, 446, 920, 921; 427/180, 294, 315, 373, 397.7; 106/86, 121

[56] References Cited

U.S. PATENT DOCUMENTS

| | | | |
|---|---|---|---|
| 3,745,058 | 7/1973 | Paymal | 428/313.5 |
| 4,130,687 | 12/1978 | Ballard et al. | 428/313.7 |
| 4,269,628 | 5/1981 | Ballard et al. | 428/317.9 |
| 4,366,204 | 12/1982 | Briggs | 428/318.4 |

*Primary Examiner*—William J. Van Balen
*Attorney, Agent, or Firm*—Cushman, Darby & Cushman

[57] ABSTRACT

A fire-resistant material comprising a network of bonded expanded polystyrene beads having an organic or inorganic impregnant material incorporated in the interstices in the network so as to provide a reticulated impregnant structure which is retained upon destruction of the network of bonded expanded polystyrene beads, for example in a fire, and the structure retained upon removal of the polystyrene. The preferred impregnant material is a layer mineral, especially chemically delaminated vermiculite.

14 Claims, No Drawings

NETWORK OF BONDED EXPANDED POLYSTYRENE BEADS HAVING CHEMICALLY DELAMINATED VERMICULITE IMPREGNANT

This invention relates to fire-resistant materials and their preparation, and particularly to fire-resistant materials comprising expanded polystyrene modified by the incorporation of organic or inorganic materials.

Polystyrene is used extensively in the building industry for heat and sound insulation applications and/or decorative purposes, for example in insulation panels, ceiling tiles and linings for wall coverings. Although an extruded form is known, polystyrene is used mainly in the form of a very light-weight, cellular material made from small particles (commonly known as "nibs") of the polymer which are pre-expanded into lightweight beads and the beads are then bonded together by heat at their points of contact as they simultaneously expand further, to provide products of the desired shape. The expanded material is inexpensive and exhibits excellent thermal insulation properties but suffers from the major disadvantage that it is inherently flammable and exhibits little or no resistance to flame; it is in fact notorious as a fire hazard. Attempts have been made to improve the fire performance of polystyrene products by incorporating flame-retarding additives therein such that in a fire surface spread of flame is inhibited, dripping is avoided and a degree of resistance to burning is exhibited. Nevertheless fire-retarded grades shrink extensively in a fire and collapse to leave a black resinous residue, and the performance of polystyrene products, even fire-retarded products, in a fire leaves something to be desired. Indeed in order to meet the fire standards required by building regulations, polystyrene is usually laminated with plaster board with the consequent penalties of increased cost and increased weight.

It has also been proposed to make fire-resistant products from expanded polystyrene beads by coating the expanded beads with a non-flammable material such as a silicate or a layer mineral and forming the coated beads into product forms wherein the coated beads are glued together at their points of contact. The fire performance of such products is greatly improved compared with conventional expanded polystyrene products in that in a fire the polystyrene does not melt and drip prior to and/or during burning and whilst the polystyrene may be burnt out there remains an inorganic structure of foam-like appearance. Such products may exhibit fire-barrier characteristics. However, the desirable physical properties of conventional expanded polystyrene products and particularly their toughness and light weight are in general adversely affected. In addition, the fabrication of products by glueing together coated beads lacks the ease of production inherent in the conventional process involving simply heating the beads to melt-weld them, i.e. to create polymer bonds between them, and requires new technology.

The present invention is based on the modification of expanded polystyrene products with non-flammable or char-forming organic or inorganic materials in such a way that the fire performance of the products is greatly enhanced whilst the desirable toughness characteristics, strength and light weight are generally retained, while modulus is increased. Although the new materials are inevitably denser and heavier than corresponding materials made entirely of expanded polystyrene, they nevertheless are lighter in weight than conventional building materials comprising expanded polystyrene laminated with plaster board.

According to the present invention there is provided a fire-resistant material comprising a network of bonded expanded polystyrene beads incorporating an organic or inorganic material in the interstices in the network such as to provide throughout the material a reticulated structure which is retained upon destruction of the network of bonded expanded polystyrene beads in a fire.

There is also provided according to the invention a method for the manufacture of a fire-resistant material which comprises introducing a suspension of particles of an organic or inorganic inpregnant material in a liquid medium into the interstices in a network of bonded expanded polystyrene beads and removing at least part of the liquid medium to provide a reticulated impregnant structure throughout the network of bonded expanded polystyrene beads.

The material incorporated in the network of bonded expanded polystyrene beads preferably is an inorganic material and especially preferably is a layer mineral or a mixture of materials containing a layer material.

The method for the manufacture of a fire-resistant material is also a method for imparting fire-resistance to materials comprising a network of bonded expanded polystyrene beads.

The materials of the invention comprise both a network of bonded polystyrene beads and a network of an organic or inorganic material such as a layer mineral, the latter network having structural integrity such that upon destruction of the bonded polystyrene bead network in a fire, e.g. by evaporation and/or burning, the network remains essentially intact so as to provide a barrier to the spread of the fire. In addition to providing a residual barrier in a fire, the retained network serves to prevent dripping of the polystyrene, to slow down the rate of burning of the polystyrene and limit surface spread of flame, and to greatly reduce smoke liberation as a result of burning the polystyrene.

Removal of the polystyrene from the new materials and in particular substantially complete removal of the polystyrene network may be effected deliberately to provide a residual network of foam-like appearance which is provided according to a further feature of the invention.

In making the new materials conventional expanded polystyrene bead technology may be employed to provide a product comprising a network of bonded polystyrene beads. A typical process comprises pre-expanding polystyrene nibs containing a blowing agent such as pentane to provide pre-expanded beads containing a residual capacity for expansion. For example nibs are typically pre-expanded by a ratio of about 30:1 by volume leaving a residual expansion capacity in the pre-expanded beads. The pre-expanded beads are typically then moulded under the influence of heat, usually supplied by steam, to cause the beads to bond together (melt weld) at their points of contact and simultaneously to further expand the beads to form low-porosity products. The final product is a material comprising a network of bonded polystyrene beads, although the individual beads may no longer be recognisable. It is to be understood that this method of preparing a material comprising a network of bonded polystyrene beads is given by way of a guide only and that other methods for making the material may be used if desired. For example, expanded polystyrene beads may be glued together using an adhesive to form the network of bonded polystyrene beads.

The material comprising a network of bonded expanded polystyrene beads in which the beads have been further expanded during bonding is a material having interstitial porosity into which the suspension can be introduced in the interstices to provide the desired reticulated network, and such an intermediate material is included within the expression "a network of bonded expanded polystyrene beads". However we prefer to produce an intermediate material of high interstitial porosity formed by bonding pre-expanded polystyrene beads together substantially without simultaneously further expanding the beads by their residual expansion capacity. This can be effected using beads having a residual capacity for expansion by controlling the conditions under which bonding of the beads is effected, for instance by employing slightly lower temperatures and/or higher pressures than are usual for effecting the bonding, and/or modifying the cooling cycle for the bonded beads. The resulting material comprises a network of bonded expanded polystyrene beads in which the individual beads are still recognisable and the interstices in the network (i.e between beads) are larger and more accessible to the suspension to be applied subsequently.

The network of bonded polystyrene beads may, as stated hereinbefore, be produced by gluing an assembly of polystyrene beads together at the points of contact of the beads. Such a network may be produced by mixing the polystyrene beads with an adhesive to coat the beads, assembling the coated beads into the desired shape and allowing or causing the adhesive to dry and set, or by assembling the beads into the desired shape, impregnating the assembly with an adhesive and then allowing or causing the adhesive to dry and set. Any adhesive may be used which has affinity for polystyrene and inorganic materials such as silicates may be used as well as organic adhesives. Examples of organic adhesives which may be used are epoxy resin adhesives, styrene-based adhesives and the so-called protein glues.

The size of the polystyrene beads (pre-expanded beads) used to form the network of bonded polystyrene beads is not critical and may vary over a wide range, for example from 1 mm to about 5 mm diameter, typically from 1.5 mm to about 3.5 mm diameter. However, the size of the beads has an affect on the integrity and in particular the stability of the residual network produced by removal of the polystyrene, and in general the smaller the polystyrene beads, the greater will be the integrity and stability of the residual network. For this reason we prefer to employ small polystyrene beads, for example beads of about 1 mm to 1.5 mm diameter although in general the smaller the beads used, the greater will be the apparent bulk density of the materials. Whilst the polystyrene beads will normally be essentially spherical, it is to be understood that spherical beads are not essential and in fact beads of any desired shape may be employed.

Fire-resistance is imparted to the material comprising a network of bonded expanded polystyrene beads by impregnating the network with a suspension of the organic or inorganic material and removing the liquid of the suspension to create a network of the impregnating material mineral within the network of bonded polystyrene beads. In the first step of this process, a suspension of an impregnant such as a layer mineral in a suitable liquid medium, usually water, is applied to the network of bonded polystyrene beads such that the suspension (and hence the impregnant) enters the interstices in the bonded polystyrene bead network. Application of the suspension can be by any technique which ensures thorough penetration of the polystyrene network by the suspension, for example by forcing the suspension through the network under external pressure and/or drawing the suspension into the network by applying a source of vacuum to the network. The application technique may depend at least partly on the openness of the polystyrene network and hence on the ease with which penetration of the network by the suspension is achieved. As a guide, drawing the suspension, preferably upwards through and into the polystyrene network by a vacuum technique is a suitable technique applicable to most forms of polystyrene network. Impregnation by dipping is a satisfactory technique in many cases.

We prefer to employ a technique by which the suspension is passed through the polystyrene network such that particles of the impregnant become entrapped in the interstices of the polystyrene network whilst the liquid phase of the suspension passes through the network, i.e the network acts as a filter for the suspension. In this way high loadings of layer mineral in the polystyrene network can be achieved and if desired the interstices in the polystyrene network may be substantially completely filled with particles of the impregnant.

Wetting and penetration of the polystyrene bead network by the suspension of impregnant, which may be of high solids content, may if desired be assisted by incorporating in the suspension a viscosity-modifying agent such as sodium pyrophosphate and/or wetting agents.

After the particles of impregnant have been introduced in the desired amount into the polystyrene network, the liquid medium of the suspension is at least partially removed. Removal of the liquid medium, which usually will be water, is preferably essentially completed, and will usually be by evaporation. If desired, the material may be heated to remove the liquid at any temperature low enough to avoid damage to (e.g softening of) the polystyrene, e.g up to 60° C. or even 70° C.

A range of fire-resistant materials is available depending upon the polystyrene network used and the processing conditions employed, especially in cases where the basic polystyrene network comprises bonded beads having residual expansion capability. Thus, for example, the residual capacity of the beads for expansion may be utilized to expand the beads after application of the suspension of the impregnant to the beads, i.e before, during or after the liquid medium of the suspension has been removed from the material.

In the case where the polystyrene beads do not have a residual capacity for expansion, the material is simply dried to provide a fire-resistant material according to the invention. A similar material is obtained using beads having a residual capacity for expansion but controlling the drying conditions such as to avoid expanding the beads.

The impregnant may be any organic or inorganic material which produces a network structure within the polystyrene bead network which has integrity and is retained upon removal of the polystyrene, for example in a fire. Organic materials which are film-formers and which produce a char structure when subjected to a fire may be employed, for example melamine-formaldehyde resins as also may flame-retardant polymers, for example polymers which contain a high content of halogen atoms and which are resistant to burning. Preferably, however, an inorganic impregnant is used and examples of suitable inorganic materials are silicates, Plaster of Paris and layer minerals.

Any layer mineral may be employed to provide the reticulated layer mineral structure within the bonded polystyrene bead network, for example vermiculite, clays (e.g ball clay, China clay, and fire clays), montmorillonite/bentonite and sepiolite, but since the layer mineral network should have structural integrity so that it remains intact upon destruction of the bonded polystyrene network in a fire, we prefer to employ a layer mineral capable of providing a network of good structural integrity. The preferred layer mineral is vermiculite and especially preferred is vermiculite which has been chemically delaminated, as described hereinafter, into tiny, extremely thin flakes or plate-like particles known as vermiculite lamellae. Mixtures of vermiculite with other layer minerals or other materials may be employed if desired, in which case the materials may be applied to the bonded polystyrene network from a suspension of the mixed materials or by sequential application to the bonded polystyrene network of suspensions of single materials.

Sequential application of suspensions of different materials to the bonded polystyrene network enables layer minerals and other materials to be employed which do not produce a network having appreciable structural integrity when used alone. Thus there may first be applied a suspension of a material which creates a network of good structural integrity, for example chemically delaminated vermiculite, and thereafter there may be applied one or more suspensions of other materials which do not themselves create a strong network, e.g clay. In this way the interstices in the polystyrene network are lined with the material which creates the desired network of high structural integrity and are then filled with the other material(s) which contribute little if any structural integrity to the network. In a variation of this theme, the materials applied as fillers, i.e after application of the material which creates a network of high structural integrity, need not be an inorganic material and indeed any desired filler may be applied; the filled material so produced is provided according to a further feature of the invention.

As stated, the preferred layer mineral is vermiculite, by which we mean all minerals known mineralogically and commercially as vermiculite, including for example the chlorite vermiculites. By the term 'vermiculite lamellae' we mean tiny particles of vermiculite of maximum dimension below 100 microns and thickness below 1 micron and having a high aspect ratio of at least 100:1, preferably at least 1000:1. Preferred vermiculite lamellae are plate-like particles of maximum dimension below 50 microns, preferably below 20 microns, and thickness below 0.05 micron, obtained by chemically delaminating and then grinding vermiculite.

Chemical delamination of vermiculite into lamellae is well known and generally comprises treating vermiculite ore granules with one or more solutions of one or more metal or alkylammonium salts followed by swelling of the granules in water and then shearing (milling) the swollen granules in water to provide a suspension of vermiculite lamellae. The suspension so produced may be used directly in the process of the present invention, though we prefer to eliminate from the suspension all particles of size greater than 50 microns, preferably all particles of size greater than 20 microns.

The solids content of the suspension applied to the bonded polystyrene network is not critical and may vary over a wide range, provided that the viscosity and rheology of the suspension are such as to permit penetration of the bonded polystyrene network by the suspension. Typically the solids content of the suspension will be in the range of from 10% to 30% by weight based on the suspension, though this range is intended as a guide only and amounts outside the quoted range may be appropriate in some instances.

The suspension of the impregnant, for example the layer mineral may, if desired, be applied to the bonded polystyrene network in the form of a wet foam or froth so that upon removal of the liquid medium from the impregnated material the impregnant forms a dry, rigid foam of cellular structure in the interstices in the bonded polystyrene network.

The amount of the impregnant in the fire-resistant materials of the invention, i.e the loading of the impregnant into the bonded polystyrene network, may vary within wide limits but should be at least sufficient to provide a reticulated structure of structural integrity within the bonded polystyrene network. In general the greater the loading of impregnant in the material, the greater will be the fire resistance of the material and the greater will be the structural integrity of the structure remaining after destruction of the bonded polystyrene network.

The density (apparent bulk density) of the fire-resistant materials of the invention may vary over a wide range, depending for example upon the size and density of the expanded polystyrene beads employed to form the polystyrene network and the loading of impregnant. Typical densities are in the range of 15 to 200 Kg/m$^3$. The new materials may be lightweight and may retain most of the appearance and handling characteristics of conventional expanded polystyrene materials. In particular, although some increase in flexural modulus of the material occurs, and an increase in compressive strength may occur, with increasing loading of the impregnant, the new materials retain much of the toughness associated with conventional polystyrene products.

The thermal insulation properties of the new materials in terms of thermal conductivity (K-factor) match those normally associated with foamed organic polymer materials, although they are slightly inferior to conventional polystyrene materials. Thus for example conventional expanded polystyrene products commonly have a K-factor (at 25° C.) of about 0.037 W/mK at 16 Kg/m$^3$ to 0.032 at 30 Kg/m$^3$ density whilst typical K-factors for the new materials containing vermiculite are in the range of 0.035 at 20 Kg/m$^3$ to 0.044 at 70 Kg/m$^3$ apparent bulk density, (but normally below 0.040). In general the K-factor of the new materials increases with increasing loading of the impregnant. The thermal diffusivity of the new materials is significantly less than for conventional polystyrene products, thus providing a more effective fire barrier.

If desired, the new materials of the invention may be laminated with one or more facing layers of for example, paper, fabric, layer minerals (and especially vermiculite-impregnated fibre, especially glass fibre scrim), wood, plastic sheet, plaster board or a cemenititious material. The laminate may be formed by conventional lamination techniques involving use of an adhesive to bind the facing layer(s) to the impregnated polystyrene material. Alternatively, and especially where the impregnant is chemically delaminated vermiculite, the impregnant itself may be used as the binder. For example the polystyrene network impregnated with the suspension of vermiculite may be dried in contact with a facing layer such that the facing layer is bonded to the impregnated polystyrene network during drying of the network. Bonding of the facing layer(s) may be enhanced by providing a layer of the layer mineral suspension on the surface of the impregnated polystyrene network to which the facing layer(s) is/are applied. It will be evident that drying such a material in the absence of a facing layer yields a material comprising a polystyrene/vermiculite core faced with a layer of vermiculite.

The materials of the invention are resistant to degradation by water which does not degrade the bonded polystyrene network. They are generally substantially impermeable to vapours if the polystyrene beads are fully expanded and/or if the loading of impregnant is high such that the interstices in the network are substantially completely filled, and may exhibit vapour barrier properties. The water-resistance of polystyrene/vermiculite materials can be enhanced by treatment to render the vermiculite structure resistant to liquid water. This may be effected in known manner, for example by incorporating magnesium oxide particles in the vermiculite suspension applied to the bonded polystyrene network, by treating the dry polystyrene/vermiculite material with ammonia gas or the vapour of an amine, or by treating the material with a solution of a magnesium salt such as magnesium chloride. The layer mineral structure can be rendered water-proof by incorporating a silicone polymer precursor, for example sodium methyl siliconate, in the layer mineral suspension and subjecting the material whilst damp to an acidic gaseous medium such as carbon dioxide which in the presence of moisture converts the silicone polymer precursor into the corresponding polymer.

The materials of the invention may be used in any of the applications where conventional polystyrene materials are employed and additionally they may be used in applications requiring a material of greater fire resistance than is normally attributed to polystyrene materials. Ceiling tiles, insulation panels for walls and roofing, pipe-insulation sections and wall coverings are typical of such applications. The fire-resistance of the materials may be enhanced for applications where fire protection is especially important by forming the bonded polystyrene network from a fire-retarded grade of polystyrene i.e polystyrene in which one or more fire-retarding additives has been incorporated.

The invention is illustrated but in no way limited by the following examples.

EXAMPLE 1

Pre-expanded polystyrene beads having a residual expansion capacity were placed in a steel ring mould of diameter 5 cm and depth 1.2 cm. The polystyrene was standard grade (i.e non fire-retarded) and the pre-expanded beads (pentane blowing agent) were substantially spherical and of mean diameter approximately 1.5 mm. The beads were held in the ring mould by perforated square metal plates and gauzes bolted together outside the metal ring.

The filled mould was supported on a wire frame at the centre of a domestic pressure cooker (with pressure-relief valve) containing water and the pressure cooker was heated on an electric ring to boil the water. The pressure-relief valve was loaded at 15 psig such that steam at approximately 120° C. was generated within the pressure cooker.

The steam in the pressure cooker was maintained at 15 psig pressure for 30 seconds after which time the pressure cooker was removed from the heat source and sprayed with cold water to cool it rapidly, the resulting reduced pressure in the pressure cooker being relieved by the valve to prevent collapse of the polystyrene beads.

The mould was removed from the pressure cooker and the polystyrene disc was demoulded. This product was strong and handleable and consisted of a network of bonded polystyrene beads in which the beads were polymer bonded together at their points of contact. The pressure generated in the pressure cooker had restricted expansion of the beads so that the product was of high iterstitial porosity and the individual beads were still recognisable.

The disc of bonded polystyrene beads was placed on a sintered glass disc in a Buchner funnel connected below the disc to a source of vacuum and a suspension of vermiculite lamellae in water was knife-spread over the upper surface and sides of the disc. The suspension was produced by treating vermiculite ore granules consecutively with refluxing aqueous sodium chloride solution and refluxing aqueous n-butylammonium chloride solution followed by swelling in water and milling of the resulting swollen particles in water. The suspension was wet classified to eliminate all particles of size greater than 50 microns and had a solids content of approximately 16% by weight. The funnel was connected with the source of vacuum whereupon the vermiculite suspension was drawn into the disc of bonded polystyrene beads, the sintered glass disc below the polystyrene disc ensuring substantially uniform distribution of the suspension within the polystyrene disc.

The impregnated polystyrene disc was removed from the Buchner funnel and dried by heating at 60° C. overnight in an air oven. This disc, which was highly porous and had good handle strength, was subjected to a fire test in which it was placed 2 cm above the tip of the blue portion of a bunsen burner flame such that the flame played on the centre of the disc. It was observed that the polystyrene burned in the region of the disc contacted by the flame. However there was no sign of dripping from the disc and smoke emmission from the burning disc was slight. Burning was confined to a circular area of approximately 3 cm diameter around the point of contact of the flame and little if any surface spread of flame was observed. After a few minutes the flame broke through and ignited the polystyrene on the surface of the disc remote from the flame. Thereafter the residual char remained in the flame for 15 minutes during which time it glowed red but remained intact. Subsequent examination of this char under a microscope revealed a foam-like network of vermiculite (blackened in places by carbon) showing clearly the configuration of the polystyrene network which had been removed by burning.

In a further fire test a similar disc of dry, impregnated polystyrene was placed with a bunsen burner flame playing on its edge. In this case the flame spread rapidly up the side of the disc and began to spread over the surface of the disc remote from the flame. Again, however, the surface spread of flame was limited and there was no sign of dripping although smoke emission in this case was greater than in the first test. The residual char after 15 minutes was again a blackened, foam-like network of vermiculite.

By way of comparison, a bonded expanded polystyrene bead disc prepared as above but not impregnated with vermiculite was placed in the bunsen burner flame. Within seconds the disc was completely destroyed and extensive dripping and smoke emission was observed.

In a further experiment a freshly-impregnated disc prepared as above was placed whilst still wet in the ring mould used to produce the polystyrene disc and the mould was returned to the pressure cooker. The disc was subjected to steam at 120° C. and 15 psig for 30 seconds, after which time the pressure was released rapidly without cooling the pressure-cooker. This treatment caused the polystyrene beads to expand further to provide a material of low interstitial porosity and good handle strength. The fire-performance of this disc was similar to that described above for the dry, vermiculite impregnated disc.

In a further experiment, an impregnated disc was dried at room temperature and the dry disc was returned to the ring mould and steamed at 120° C. and 15 psig for 30 seconds as described above. The product was a material of low interstital porosity and good handle strength which exhibited a fire performance similar to that described above for the dry, vermiculite impregnated disc.

EXAMPLE 2

Conventional polystyrene bead technology, modified slightly as described below, was employed to produce a bonded polystyrene billet of dimensions approximately 2.4 m×1.2 m×60 cm, using polystyrene beads of approximately 3 mm diameter. The conventional process was modified by controlling the steam temperature, the residence time of the beads in the steam, and the cooling cycle such that expansion of the beads during steaming and cooling was restricted whilst the beads were polymer-bonded together to provide a material of higher than usual interstitial porosity. The billet was demoulded and cut by hot wire (electrically heated) into slabstock of dimensions approximately 2.4 m×1.2 m×2.5 cm. The interstitial porosity of the material was determined as approximately 25%, and its density was 17 Kg/m$^3$.

Samples of dimensions approximately 60 cm×60 cm×2.5 cm were cut from the slabstock, and a sample was placed on a layer of filter paper in a mould having a connection below the base-plate to a source of vacuum.

An aqueous suspension of vermiculite lamellae (chemically delaminated vermiculite) of solids content 16% by weight, classified by removal of all particles of size greater than 50 microns, was poured into the mould so as to uniformly cover the polystyrene board. The mould was connected to the source of vacuum whereby the vermiculite suspension was drawn into the polystyrene board, excess water being removed from the base of the mould whilst the vermiculite lamellae were retained within the board. Surplus suspension was removed from the mould and the impregnated polystyrene board was demoulded and dried at 40° C. in an air oven for 3 hours.

The dry, impregnated board was found to contain a loading of vermiculite of approximately 1:1 by weight based on the polystyrene, and its apparent bulk density was 34 Kg/m$^3$.

In a three-point bend test on two similar samples of dimensions approximately 20.4 cm×3 cm×2.5 cm, the flex strength at break of the dry impregenated board was determined as 211 KPa (average of values of 217 and 204 KPa obtained for the two samples). By comparison a test on a sample of the non-impregnated polystyrene board indicated a flex strength of only 130 KPa. By way of further comparison, published data on conventional fully-expanded polystyrene boards indicates a flex strength of the order of 200 to 230 KPa; accordingly this example demonstrates that the flex strength of the new material according to the invention is similar to that of conventional fully-expanded polystyrene boards of 15 to 17 Kg/m$^3$ density.

The flex modulus ($E_f$) of the dry, impregnated board was calculated from the data obtained in the three-point bend test described above and determined as 19.52 MPa (average of values for the two samples). By comparison, the flex modulus of the polystyrene board before impregnation was determined as only 10 MPa.

The thermal conductivity (K-factor) at 25° C. of the dry impregnated board was determined as 0.037 W/MK (where K=°Kelvin). By comparison the K-factor of the polystyrene board before impregnation was determined as 0.034 W/MK. By way of further comparison typical published values of K-factor (W/MK) for conventional fully-expanded polystyrene board are 0.037 for SD grade (15 to 17 Kg/m$^3$) and 0.034 for HD grade (30–34 Kg/m$^3$).

EXAMPLE 3

The procedure described in Example 2 was employed using polystyrene beads of diameter approximately 3 mm to produce a dry vermiculite-impregnated board of apparent bulk density 48 Kg/m$^3$ in which the vermiculite loading was 1.8:1 by weight based on the polystyrene. The K-factor of this board at 25° C. was determined as 0.040 W/MK. This example read in conjunction with Example 2 demonstrates that increasing the vermiculite loading of the board from 1:1 to 1.8:1 by weight based on the polystyrene increased the K-factor of the board by 0.003 W/MK only.

EXAMPLE 4

The procedure described in Example 2 was employed using polystyrene beads of diameter approximately 1.5 mm to produce a dry, vermiculite-impregnated board in which the vermiculite loading was approximately 1.4:1 by weight based on the polystyrene. The density of the polystyrene board prior to impregnation with the vermiculite suspension was determined as 32 Kg/m$^3$ and its interstitial porosity as approximately 25%. The apparent bulk density of the dry, impregnated board was about 70 Kg/m$^3$.

In the three-point bend test described in Example 2, the flex strength at break of the impregnated board was determined (two samples) as 235 KPa and its flex modulus as 20 MPa. By comparison, the flex strength at break and flex modulus of the non-impregnated polystyrene board were determined (two samples) as 185 KPa and 10 MPa respectively. The compressive strength of the impregnated board at 10% strain was 230 KPa compared with 141 KPa for the board prior to impregnation.

The thermal conductivity (K-factor) at 25° C. of the impregnated board was determined as 0.044 W/MK; for purposes of comparison the K-factor of the polystyrene board prior to impregnation was determined as 0.032 W/MK.

EXAMPLE 5

A sample of a polystyrene board of density 32 Kg/m$^3$ and interstitial porosity approximately 25%, made from 1.5 mm diameter polystyrene beads as described in Example 4 was impregnated with a suspension of vermiculite lamellae as described in Example 2.

The impregnated board, whilst still wet, was cut into three pieces and two of these pieces were dried in an oven at 50° C. for 2 hours (Samples I and II).

The third piece of wet board was placed in a mould and treated with dry steam at 120° C. for 30 seconds to fully expand the polystyrene beads and simultaneously dry the board (Sample III).

One of the impregnated boards which had been dried in an oven was also placed in a mould and treated with steam at 120° C. for 30 seconds to fully expand the polystyrene beads (Sample II).

The three boards had approximately the same apparent bulk density but the interstitial porosity of Samples II and III was only approximately 5% compared with approximately 20% for Sample I.

EXAMPLE 6

A polystyrene board was made from polystyrene beads of diameter 3 mm and impregnated with a suspension of vermiculite lamellae by the procedure described in Example 2.

Whilst still wet and still in the impregnation mould, the vermiculite-impregnated board was further impregnated with an aqueous suspension of a Kaolin ball clay. The loading (vermiculite and clay) of the board was 1.4:1 by weight based on the polystyrene.

The impregnated board was air dried for 8 hours and then heated at 50° C. in an oven for 3 hours.

The flex strength of the dry board was determined using the three-point bend test as 185 KPa. The K-factor of the board at 25° C. was determined as 0.386 W/MK, and its compressive strength at 10% strain as 93 KPa.

EXAMPLE 7

A dry, vermiculite-impregnated board produced as described in Example 2 (vermiculite loading 1:1 by weight based on the polystyrene; apparent bulk density 34 Kg/m$^3$) was subjected to various fire tests as described below.

Test A: A sample of the board of dimensions 25 cm×2 cm+2 cm was subjected to the Butler Chimney Test ASTM 30141-73 for flammability. In this test, the sample, coated with vermiculite on two adjacent surfaces, is positioned vertically on metal spikes in a chimney fitted with a glass observation panel. A bunsen burner flame is applied at the bottom of the sample for a period of 10 seconds after which time the bunsen burner is removed. The samples is weighed before and after the test and during the test the height reached up the sample by the flame and the time taken for the flame to extinguish after removal of the bunsen burner are recorded.

Upon application of the bunsen burner flame to the sample there was initial transitory flash-burning of the exposed polystyrene beads and flame reached a height of approximately 22 cm up the sample (maximum height permitted for a pass is 25 cm). There was very little smoke emmision from the sample and no trace of dripping. The flame extinguished rapidly (15 to 30 seconds in different tests) after removal of the bunsen burner flame, and 92% to 95% by weight of the starting material remained after the burning.

For purposes of comparison, a non-impregnated sample of the same polystyrene board was subjected to the test. This sample was burnt in a few seconds with constant dripping and no material remained for weighing after the test.

Test B: A sample of the impregnated board was subjected to a Kleinbrenner DIN 4102 1B2 fire test which is a small-scale version of the DIN 4102 Brandschacht test suggested as the minimum fire standard for housing construction in West Germany.

A sample of the board of dimensions 190 mm×90 mm×25 mm is fitted vertically into a holder and a small pilot flame (gas burner) is applied for 15 seconds to the lowest corner edge face of the sample, for determination of k-value, or at a point 19 cm from the lower edge on the face, for determining f-value. A controlled draught is allowed to pass through the apparatus during the test. A line is drawn on the sample at a level 15 cm from the lowest edge; for a B2 fire rating the flame must not pass this line.

In the k-value test (flame applied at bottom edge of sample) the maximum height reached by the flame was 13 cm. The time for the flame to extinguish was approximately 15 seconds. The material thus achieved a B2 fire rating.

In the f-value test (flame applied to the face of the sample), the maximum flame height was 6 cm and the flame again extinguished in approximately 15 seconds. The material thus achieved a B2 fire rating.

Further tests were then performed on a sample of the same impregnated board which had been surface-coated with vermiculite after impregnation, using the same vermiculite suspension with which the board had been impregnated. In the k-value test the maximum flame height recorded was 3 cm whilst in the f-value test the flame height was again 6 cm. In both tests the time for the flame to extinguish remained at approximately 15 seconds.

Test C: The impregnated board was tested according to XP2 Smoke Chamber BS 5111 Part 1. In this test, 2.5 cm cubes of the board are ignited by a bunsen burner and smoke emission is measured by the obscuration of light between two photoelectric cells.

In a first test, the maximum light obscuration observed was 29% recorded after a period of 33 seconds burning; the obscuration due to deposits (rather than smoke) was determined as 4.5%. In a second test, the maximum light obscuration observed was 32% recorded after a period of 77 seconds burning; the obscuration due to deposits was determined as 2%. The samples were weighed before and after burning to determine weight loss; in the first test the weight loss was 40% and in the second test it was 32%.

For purposes of comparison, a sample of the non-impregnated polystyrene board was tested. Maximum light obscuration was determined as 74% recorded after 7 seconds; obscuration due to deposits was 5.5%. The weight loss of the sample was 100%; the sample was completely destroyed within 10 seconds.

Test D: A sample of the impregnated board was subjected to an ignition test according to BS 4735. In this test a sample of dimensions 15 cm×5 cm×1.2 cm is laid horizontally on a metal mesh and a flame is applied by a fish-tail bunsen burner at a narrow (5 cm) edge for 60 seconds. The sample is housed in a draught-free enclosure which permits normal circulation of air past the sample during burning. The time is noted at which the flame is extinguished and ceases to spread along the sample.

Three tests were carried out. In each the sample of board used was coated on one side with vermiculite; in the first and second tests the edges of the sample were uncoated whilst in the third test one edge of the sample was also coated with vermiculite.

In the first test, the sample was placed with the coated side downwards; the extent of burning was 68 mm and the time to extinction of flame was 122 seconds.

In the second test the sample was placed with the coated side uppermost; the extent of burning was 32 mm and the time to extinction of flame was 43 seconds.

In the third test the sample (one edge coated) was placed with the coated face downwards; the extent of burning was 50 mm and the time to extinction of flame was 87 seconds.

Test E: A sample (15 cm×15 cm×2.5 cm) of the impregnated board was subjected to a burn-through test in which it was held vertically and a propane torch flame was played upon one face. The time taken for the sample to collapse with consequent "burn through" was recorded. The sample did not collapse in the flame although the polystyrene burned and the sample became blackened on the reverse face after about 4 minutes. The vermiculite foam structure remaining after the polystyrene had burnt away remained in the flame and glowed red-hot for a further period of 15 minutes. Examination of the sample after cooling indicated slight damage to (collapse of) the surface of the residual vermiculite network owing to the velocity of the very strong propane torch flame.

Test F: A surface spread of flame test was carried out according to BS 476 Part 7 (Small-Scale). In this test a sample of board of dimensions 30 cm×10 cm×1.2 cm, marked off horizontally into 8 divisions at 2 cm intervals from the lowermost edge is placed lowermost edge against a furnace wall and a pilot light at the furnace face is allowed to play on the sample for 1 minute before being extinguished. The spread of the flame along the sample is recorded with time. It was observed that the flame did not spread steadily over the surface of the sample but rather the flame spread by intermittent flashing followed by very brief periods of burning. Insofar as the flame exhibited a leading edge, the sixth line on the sample 12 cm from the lowermost edge of the sample was crossed after 125 seconds. The flame then extinguished shortly after crossing the sixth line.

EXAMPLE 8

Using the procedure described in Example 2 a polystyrene board of density 17 Kg/m$^3$ made from 3 mm diameter beads was impregnated with an aqueous suspension of montmorillonite and the board was dried. The loading of montmorillonite in the board was 0.6:1 by weight based on the polystyrene and the apparent bulk density of the board was 27 Kg/m$^3$. The compressive strength of the board at 10% strain was 75 KPa and its flex strength at break was 150 KPa. The K-factor (at 25° C.) of the board was 0.0368 W/MK.

EXAMPLE 9

A polystyrene board of density 17 Kg/m$^3$ made from 3 mm diamter beads was impregnated with an aqueous suspension of ball clay and dried as described in Example 2. The loading of clay in the board was 3:1 by weight based on the polystyrene and the apparent bulk density of the board was 64 Kg/m$^3$. The compressive strength at 10% strain of the board was 104 KPa and its flex strength at break was 185 KPa. The K-factor (at 25° C.) of the board was 0.0392 W/MK.

EXAMPLE 10

Using the procedure described in Example 2 a polystyrene board of density 17 Kg/m$^3$ made from 3 mm beads was impregnated with a gasified (foamed) aqueous suspension of vermiculite lamellae and dried. The suspension was gasified by beating air into it by rapid whisking in a Kenwood Chef food mixer. The loading of vermiculite (foam) in the board was 0.9:1 by weight based on the polystyrene and the apparent bulk density of the board was 29 Kg/m$^3$. The compressive strength at 10% strain of the board was 80 KPa and its flex strength at break was 163 KPa. The K-factor (at 25° C.) of the board was 0.369 W/MK.

EXAMPLE 11

A porous board of size 29 cm×21.7 cm×2.4 cm and density 14.8 Kg/m$^3$ made from expanded polystyrene beads melt-welded by steam heating at their points of contact, was impregnated with a slurry of Plaster of Paris (1 Kg) in water (1250 g). Impregnation of the board was effected by applying a vacuum above the board and drawing the slurry upwards into and through the board. The impregnated board was dried in air for 8 hours and then at 50° C. in an oven for 3 hours. The dry impregnated board was weighed and the loading of impregnant was 10.3:1 of Plaster of Paris: polystyrene (14.8 Kg/m$^3$ polystyrene and 96.4 Kg/m$^3$ Plaster of Paris). The density of the board was 168 Kg/m$^3$ and the K-factor of the board at 25° C. was 0.05 W/MK. Magnesium oxide powder was stirred into a 17% solids content vermiculite suspension to provide a suspension containing 5% by weight magnesium oxide. The suspension was applied by spreader bar to one side of the impregnated polystyrene board and the coating was dried at room temperature; a dry coating weight of 134 g/m$^2$ was determined.

The flame from a propane torch was applied to the coated face of the impregnated polystyrene board. The fire resistance of the board was noted as greater than 40 minutes compared with a few seconds only for a similar sample of the polystyrene board which had not been impregnated or coated. The rear surface of the coated, impregnated board reached a temperature of 115° C. after 15 minutes. The effect of the flame was to cause burning of the polystyrene which was removed completely in the region contacted by the flame, leaving a Plaster of Paris network structure which glowed incandescent in the flame but remained intact throughout application of the flame. It was observed that very little smoke was emitted from the board during the test, and there was no sign of dripping.

EXAMPLE 12

A porous bonded polystyrene bead board of density 16.1 Kg/m$^3$ was impregnated as described in Example 11 with a suspension obtained by mixing a 17% by weight vermiculite suspension with a 7.5% by weight montmorillonite suspension to provide a 30% montmorillonite:70% vermiculite suspension. The impregnated board was dried for 8 hours at room temperature and then at 50° C. for 3 hours. The dry loading of layer minerals: polystyrene was 1.42:1 (16.1 Kg/m³ polystyrene:22.9 Kg/m³ layer minerals).

The flame from a propane torch was applied to one side of the dry impregnated board, and a fire resistance of more than 15 minutes was observed. The polystyrene burned away in the region contacted by the flame to leave a layer mineral structure which became incandescent but remained intact. Very little smoke was observed during the test and there was no sign of dripping.

EXAMPLE 13

An epoxy resin adhesive was prepared by using an epoxy resin available under the trade name Araldite HY 753 with a hardener available under the trade name Araldite HY 951 in the proportions of 8:1 by weight. 60 g of the adhesive were added to 60 g of expanded polystyrene beads (diameter 1-2 mm) and the mixture was stirred thoroughly and then spread with a knife into a mould of dimensions 2.5 cm×32.5 cm×32.5 cm. The mixture was allowed to stand at room temperature overnight to allow the epoxy resin adhesive to set. The resulting highly-porous board weighed 92.6 g.

The board was cut to 27.5 cm wide (to fit an impregnation tank) and was impregnated by dipping with a 17% by weight suspension of chemically delaminated vermiculite of size below 50 microns containing 1% by weight of sodium pyrophosphate and 0.5% by weight of a surface active agent available under the trade name "Manoxol" OT. The impregnated board was removed from the impregnation tank and left to drain and dry overnight at room temperature, after which it was heated in a Mitchell oven at 50° C., again overnight.

The ratio by weight of vermiculite:total weight of polystyrene and adhesive in the dry board was 0.69:1 (56.55 g of vermiculite in the board of weight 138.8 g).

The impregnated board was placed in the flame from a propane torch. Slight initial surface flaming was observed and the flame gradually burned through the board, although the board survived for more than 15 minutes with a back-face temperature below 200° C. Very little smoke was observed and there was no sign of dripping. The result of the flame test was the complete removal of polystyrene from the region of the board contacted directly by the flame to leave a vermiculite network structure which glowed incandescent in the flame but remained intact throughout the test.

EXAMPLE 14

The procedure described in Example 13 was repeated except that a water resist polyvinyl alcohol adhesive was used instead of an epoxy resin adhesive. The adhesive was 'Evostik' 9517 comprising an aqueous emulsion of a polyvinyl alcohol polymer. 120 g of 'Evostik' 9517 were used to glue together 60 g of polystyrene beads to produce a board of dry weight 121 g.

A dry, impregnated board was produced in which the ratio by weight of vermiculite: total weight of polystyrene and polyvinyl alcohol was 1.39:1.

The flame from a propane torch was played onto one side of the dry impregnated board and slight initial surface flaming was observed. The board survived in the flame for more than 15 minutes with a back-face temperature below 200° C. The polystyrene gradually was burned-out from the region of the board contacted directly by the flame to leave a vermiculite network structure which glowed incandescent in the flame but remained intact throughout the test. Only slight smoking was observed and there was no evidence of dripping.

We claim:

1. A fire-resistant material comprising a network of bonded, expanded polystyrene beads and having an inorganic impregnant selected from chemically delaminated vermiculite and mixtures containing same incorporated in the interstices in the network to provide throughout the material a reticulated impregnant structure which is retained upon destruction of the network of bonded, expanded polystyrene beads in a fire.

2. A fire-resistant material as claimed in claim 1 in which the material has a filler incorporated in the interstices in the reticulated impregnant structure.

3. A fire-resistant material as claimed in claim 2 in which the impregnant structure comprises chemically delaminated vermiculite and the filler is another inorganic material.

4. A fire-resistant material as claimed in claim 3 in which the filler is a layer mineral.

5. A fire-resistant material as claimed in claim 1 in which the impregnant is chemically delaminated vermiculite of which all of the particles are of size below 50 microns.

6. A fire-resistant material as claimed in claim 1 in which the reticulated impregnant structure is in the form of a dry, rigid foam.

7. A fire-resistant material as claimed in claim 1 characterized by an apparent bulk density of from 15 to 200 Kg/m³.

8. A fire-resistant material as claimed in claim 1 wherein the bonded polystyrene bead network comprises beads of diameter from 1 to 5 mm.

9. A fire-resistant material as claimed in claim 1 having a coating layer of chemically delaminated vermiculite on at least one of its faces.

10. A fire-resistant material as claimed in claim 1 laminated with a substrate.

11. A fire-resistant material comprising a network structure which is the residue of removal of the polystryene bead network from a fire-resistant material as claimed in any one of the preceding claims.

12. A method for the manufacture of a fire-resistant material comprising a network of bonded, expanded polystyrene beads and an inorganic impregnant incorporated in the insterstices in the network which method comprises: (a) introducing a suspension of particles of an inorganic impregnant material selected from chemically delaminated vermiculite and mixtures containing same in a liquid medium into the interstices in a network of bonded, expanded polystyrene beads, and (b) removing at least part of the liquid medium to provide a reticulated impregnant structure throughout the network of bonded, expanded polystyrene beads.

13. A method as claimed in claim 12 wherein after formation of the reticulated impregnant structure, a suspension of a filler is introduced into the interstices in the network.

14. A method as claimed in claim 12 or 13 wherein the suspension is introduced into the interstices in the network by a vacuum technique.

* * * * *